(12) United States Patent
Kuo et al.

(10) Patent No.: US 12,368,565 B2
(45) Date of Patent: Jul. 22, 2025

(54) PRIORITY ADAPTATION OF POSITIONING REFERENCE SIGNAL

(71) Applicant: Nokia Technologies Oy, Espoo (FI)

(72) Inventors: Ping-Heng Kuo, London (GB); Tao Tao, Shanghai (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 296 days.

(21) Appl. No.: 18/006,928

(22) PCT Filed: Sep. 30, 2020

(86) PCT No.: PCT/CN2020/119644
§ 371 (c)(1),
(2) Date: Jan. 26, 2023

(87) PCT Pub. No.: WO2022/067755
PCT Pub. Date: Apr. 7, 2022

(65) Prior Publication Data
US 2023/0269059 A1    Aug. 24, 2023

(51) Int. Cl.
*H04L 5/00* (2006.01)
(52) U.S. Cl.
CPC ................. *H04L 5/0096* (2013.01)
(58) Field of Classification Search
CPC ... H04L 41/0609; H04L 5/0096; H04L 5/005; H04L 5/0053
See application file for complete search history.

(56) References Cited

U.S. PATENT DOCUMENTS

| | | | |
|---|---|---|---|
| 11,882,501 B2 * | 1/2024 | Qi | H04W 64/00 |
| 2018/0317107 A1 | 11/2018 | Do et al. | |
| 2020/0014487 A1 * | 1/2020 | Akkarakaran | H04L 5/0051 |
| 2020/0112970 A1 | 4/2020 | Manolakos et al. | |
| 2020/0154449 A1 * | 5/2020 | Akkarakaran | H04W 72/56 |
| 2024/0291609 A1 * | 8/2024 | Rao | H04L 5/0053 |

FOREIGN PATENT DOCUMENTS

| | | |
|---|---|---|
| CN | 103797871 A | 5/2014 |
| CN | 110730501 A | 1/2020 |
| CN | 110771085 A | 2/2020 |

OTHER PUBLICATIONS

Office Action received for corresponding Chinese Patent Application No. 202080027027.3, dated Apr. 15, 2024, 10 pages of Office Action and 6 pages of translation available.
"Maintenance of Rel-16 UL reference signals for NR positioning", 3GPP TSG-RAN WG1 Meeting #100b-e, R1-2002621, Agenda Item: 7.2.8.2, Ericsson, Apr. 20-30, 2020, pp. 1-6.

(Continued)

*Primary Examiner* — Shukri Taha
(74) *Attorney, Agent, or Firm* — Lippes Mathias LLP

(57) ABSTRACT

Example embodiments of the present disclosure relate to devices, methods, apparatuses and computer readable storage media for priority adaptation of a positioning reference signal (PRS). In example embodiments, a first device receives, from a second device, an indication associated with a change of a priority level for transmitting a positioning reference signal. Based on the received indication, the first device changes the priority level for transmitting the positioning reference signal.

14 Claims, 4 Drawing Sheets

(56) References Cited

OTHER PUBLICATIONS

"Remaining Issues on UL Positioning Reference Signal", 3GPP TSG RAN WG1 #100, R1-2000463, Agenda Item: 7.2.8.2, OPPO, Feb. 24-Mar. 6, 2020, 4 pages.
"Remaining issues on UL SRS for NR Positioning", 3GPP TSG RAN WG1 Meeting #101, R1-2003633, Agenda item: 7.2.8.2, CATT, May 25-Jun. 5, 2020, pp. 1-13.
"3rd Generation Partnership Project; Technical Specification Group Radio Access Network; NR; Physical layer procedures for data (Release 16)", 3GPP TS 38.214, V16.2.0, Jun. 2020, pp. 1-163.
"3rd Generation Partnership Project; Technical Specification Group Radio Access Network; NG Radio Access Network (NG-RAN); Stage 2 functional specification of User Equipment (UE) positioning in NG-RAN (Release 16)", 3GPP TS 38.305 V16.1.0, Jul. 2020, pp. 1-114.
"FL Summary #5 for Potential Positioning Enhancements", f3GPP TSG RAN WG1 Meeting #102-e, R1-2007343, Agenda item: 8.5.3, Moderator (CATT), May 25-Jun. 5, 2020, 113 pages.
"Discussion on potential positioning enhancements", 3GPP TSG RAN WG1 #101, R1-2003429, Agenda Item: 8.2.3, vivo, May 25-Jun. 5, 2020, 13 pages.
International Search Report and Written Opinion received for corresponding Patent Cooperation Treaty Application No. PCT/CN2020/119644, dated Jun. 24, 2021, 10 pages.
"[AT111-e][612][POS] Assumptions for analysis of commercial use cases (Ericsson)", 3GPP TSG-RAN WG2 #111-e, R2-2008261, Agenda Item: 8.11.2, Ericsson, Aug. 17-28, 2020, 35 pages.

* cited by examiner

PRIORITY ADAPTATION OF POSITIONING REFERENCE SIGNAL

RELATED APPLICATION

This application was originally filed as PCT Application No. PCT/CN2020/119644, filed on Sep. 30, 2020, which is incorporated herein by reference in its entirety.

FIELD

Example embodiments of the present disclosure generally relate to the field of communications, and in particular, to devices, methods, apparatuses and computer readable storage media for priority adaptation of a positioning reference signal (PRS).

BACKGROUND

Positioning is very important to enable various verticals and use cases in the fifth generation (5G). With the knowledge about positions of devices, applications such as location-based services, autonomous driving and industrial Internet of things (IoT) can be fulfilled by a 5G system. Typically, some positioning techniques based on the Global Navigation Satellite System (GNSS) such as the Global Positioning System (GPS) may fulfill accurate positioning in outdoor scenarios, but may not be able to enable sufficiently accurate positioning in some indoor use cases such as factory automation or warehouse management.

Radio Access Technology (RAT)-dependent positioning technologies based on downlink (DL) and/or uplink (UL) signals such as DL positioning reference signals (PRSs) and/or UL sounding reference signals (SRSs) have been developed by the 3rd Generation Partnership Project (3GPP) standards and extensively studied in Long Term Evolution (LTE) and New Radio (NR).

For example, periodic positioning SRSs may be configured to user equipment (UE) to track the UE positions when the UE is moving in a network. Accordingly, the UE may periodically transmit a positioning SRS that may be detected or measured by more than one Transmit-Receive Point and/or New Radio (NR) NodeB (gNB). The measurements obtained by these TRPs/gNBs may be reported to a location server such as a location management function (LMF) for estimation of the UE positions. Currently, when the SRS transmission collides with a Physical Uplink Shared Channel (PUSCH) and/or Physical Uplink Control Channel (PUCCH) transmission (i.e. the radio resources of these transmission overlap at least partially in time), the UE may have to drop the SRS transmission and prioritize other transmissions.

SUMMARY

In general, example embodiments of the present disclosure provide devices, methods, apparatuses and computer readable storage media for priority adaptation of a positioning reference signal (PRS).

In a first aspect, a first device is provided which comprises at least one processor and at least one memory including computer program code. The at least one memory and the computer program code are configured to, with the at least one processor, cause the first device to receive, from a second device, an indication associated with a change of a priority level for transmitting a positioning reference signal. The first device is further caused to change, based on the indication, the priority level for transmitting the positioning reference signal.

In a second aspect, a second device is provided which comprises at least one processor and at least one memory including computer program code. The at least one memory and the computer program code are configured to, with the at least one processor, cause the second device to send, to a first device, an indication associated with a change of a priority level for transmitting, by the first device, a positioning reference signal. The second device is further caused to receive, based on the indication, the positioning reference signal from the first device.

In a third aspect, a method is provided. In the method, a first device receives, from a second device, an indication associated with a change of a priority level for transmitting a positioning reference signal. Based on the received indication, the first device changes the priority level for transmitting the positioning reference signal.

In a fourth aspect, a method is provided. In the method, a second device sends, to a first device, an indication associated with a change of a priority level for transmitting, by the first device, a positioning reference signal. Based on the transmitted indication, the second device receives the positioning reference signal from the first device.

In a fifth aspect, there is provided an apparatus comprising means for performing the method according to the third or fourth aspect.

In a fourth aspect, there is provided a computer readable storage medium comprising program instructions stored thereon. The instructions, when executed by a processor of a device, cause the device to perform the method according to the third or fourth aspect.

It is to be understood that the summary section is not intended to identify key or essential features of example embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
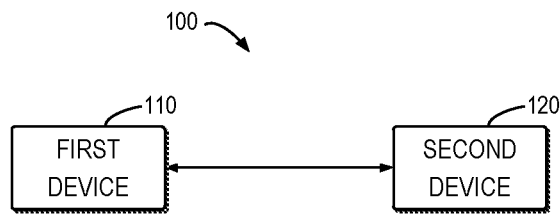
FIG. 1 illustrates an example environment in which example embodiments of the present disclosure can be implemented.

Principle of the present disclosure will now be described with reference to some example embodiments. It is to be understood that these example embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "positioning reference signal" (PRS) refers to any reference signal that can be used for the positioning purpose. Examples of the PRSs may DL PRSs transmitted by a network device to a terminal device, a UL SRS transmitted by a terminal device to a network device, or other PRSs of other types. In various embodiments of the present disclosure, the PRS may be configured in a periodic, semi-periodic or aperiodic or dynamic manner.

As used herein, the term "terminal device" or "user equipment" (UE) refers to any terminal device capable of wireless communications with each other or with the base station. The communications may involve transmitting and/or receiving wireless signals using electromagnetic signals, radio waves, infrared signals, and/or other types of signals suitable for conveying information over air. In some example embodiments, the UE may be configured to transmit and/or receive information without direct human interaction. For example, the UE may transmit information to the base station on predetermined schedules, when triggered by an internal or external event, or in response to requests from the network side.

Examples of the UE include, but are not limited to, smart phones, wireless-enabled tablet computers, laptop-embedded equipment (LEE), laptop-mounted equipment (LME), wireless customer-premises equipment (CPE), sensors, metering devices, personal wearables such as watches, and/or vehicles that are capable of communication. For the purpose of discussion, some example embodiments will be described with reference to UEs as examples of the terminal devices, and the terms "terminal device" and "user equipment" (UE) may be used interchangeably in the context of the present disclosure.

As used herein, the term "network device" refers to a device via which services can be provided to a terminal device in a communication network. As an example, the network device may comprise a base station. As used herein, the term "base station" (BS) refers to a network device via which services can be provided to a terminal device in a communication network. The base station may comprise any suitable device via which a terminal device or UE can access the communication network. Examples of the base stations include a relay, an access point (AP), a transmission point (TRP), a node B (NodeB or NB), an evolved NodeB (eNodeB or eNB), a New Radio (NR) NodeB (gNB), a Remote Radio Module (RRU), a radio header (RH), a remote radio head (RRH), a low power node such as a femto, a pico, and the like.

As used herein, the term "circuitry" may refer to one or more or all of the following:

(a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular base station, or other computing or base station.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As used herein, the terms "first", "second" and the like may be used herein to describe various elements, these elements should not be limited by these terms. These terms are only used to distinguish one element from another. For example, a first element could be referred to as a second element, and similarly, a second element could be termed a first element, without departing from the scope of example embodiments. As used herein, the term "and/or" includes any and all combinations of one or more of the listed terms.

In a current 3GPP framework, when a resource of a SRS transmission overlaps with a resource of other transmissions, for example, of a Physical Uplink Shared Channel (PUSCH) in a time domain, the UE would have to drop the SRS transmission and prioritize other transmissions. In the use case that a SRS is used for the gNB to estimate channel status, for example, to configure a multiple-input and multiple-output (MIMO) precoder, it may be acceptable that the SRS transmission has a lower priority than transmission of data and/or control signals. Nevertheless, timely positioning with low latency is crucial for certain verticals such as autonomous driving. In this case, it would be beneficial to prioritize a positioning SRS over other transmissions.

If the positioning SRS is always prioritized to seamlessly track the UE position in a network, Quality of Service (QoS) of the UE may be jeopardized especially if the UE has to transmit some Ultra-Reliable and Low Latency Communication (URLLC) data. As a result, there is a need for a trade-off between seamless positioning and communication performance of the UE.

In 3GPP Release 16 (Rel-16), intra-UE prioritization has been specified. With the prioritization, in the case that two or more transmissions (for example, PUSCH and PUCCH transmissions) conflict, the UE may determine which of the conflicting transmissions should be performed. However, the SRS priority is out of the scope of Rel-16.

In order to facilitate seamless positioning with minimal impact to uplink communication performance of the UE, it is agreed in 3GPP that SRS priority will be considered. For example, priority rules can be considered to handle the possible collision of transmissions of a positioning SRS with other uplink signals or channels in the same orthogonal frequency-division multiplexing (OFDM) symbol(s) in the same uplink carrier, but no further discussion of this issue is conducted.

It is proposed to introduce different SRS prioritization rules (other than defined rules in Rel-16) and priority indications for low-latency positioning. It is also proposed that when multiple resource sets are configured for a SRS transmission, a UE may select one resource set for the SRS transmission based on a prioritization of different SRS resource sets. However, no dynamic SRS priority adaptation is considered.

The network may need to receive/measure a SRS from a UE in a timely manner with different levels of urgency from time to time, depending on the UE mobility (which changes over time). If the gNB may allocate an aperiodic SRS with a high priority when needed, it may take some time for the network to coordinate among different gNBs to ensure that they can all hear this SRS simultaneously, which is not flexible in practice especially for a use case requiring the low-latency positioning.

Example embodiments of the present disclosure provide a dynamic adaptation scheme of a PRS priority level. With the scheme, a device (referred to as a first device) such as a UE receives, from a further device (referred to as a second device) such as a gNB, an indication associated with a change of a priority level for transmitting a PRS. Based on the indication, the first device changes the priority level for the PRS transmission. Accordingly, the second device receives the PRS from the first device based on the indication that has been transmitted.

This scheme facilitates a timely PRS transmission especially in the case that other channels or transmissions conflict with the PRS transmission on overlapping resources in the time domain. As such, it is allowed to track a position of the device timely in a network.

FIG. 1 shows an example environment 100 in which example embodiments of the present disclosure can be implemented.

The environment 100, which may be a part of a communication network, comprises two devices 110 and 120 communicating with each other or with other devices via each other. For the purpose of discussion, the devices 110 and 120 may be referred to as a first device 110 and a second device 120, respectively.

The first and second devices 110 and 120 may be implemented by any suitable devices in the communication network. In some example embodiments, the first device 110 may be implemented by a terminal device and the second device 120 may be implemented by a network device, or vice versa. In some other example embodiments, the first and second devices 110 and 120 may be both implemented by terminal devices or network devices. Just for the purpose of discussion, in some example embodiments, the terminal device will be taken as an example of the first device 110, and the network device will be taken as an example of the second device 120.

It is to be understood that two devices are shown in the environment 100 only for the purpose of illustration, without suggesting any limitation to the scope of the present disclosure. In some example embodiments, the environment 100 may comprise a further device (referred to as a third device) to communicate positioning related information with the second device 120. As an example, the third device may comprise a location server such as a LMF. Alternatively, the LMF or location server may be physically integrated with the second device 120.

The communications in the environment 100 may follow any suitable communication standards or protocols, which are already in existence or to be developed in the future, such as Universal Mobile Telecommunications System (UMTS), long term evolution (LTE), LTE-Advanced (LTE-A), the fifth generation (5G) New Radio (NR), Wireless Fidelity (Wi-Fi) and Worldwide Interoperability for Microwave Access (WiMAX) standards, and employs any suitable communication technologies, including, for example, Multiple-Input Multiple-Output (MIMO), Orthogonal Frequency Division Multiplexing (OFDM), time division multiplexing (TDM), frequency division multiplexing (FDM), code division multiplexing (CDM), Bluetooth, ZigBee, and machine type communication (MTC), enhanced mobile broadband (eMBB), massive machine type communication (mMTC), ultra-reliable low latency communication (URLLC), Carrier Aggregation (CA), Dual Connection (DC), and New Radio Unlicensed (NR-U) technologies.

The first device 110 can transmit a PRS to the second device 120 for positioning. In various example embodiments, the PRS is assigned to a changeable priority level. The second device 120 sends to an indication associated with a change of a priority level for the PRS transmission. Accordingly, the first device 110 changes the priority level of the PRS transmission based on the indication. Such priority adaptation is more flexible and feasible.

Figure 2:
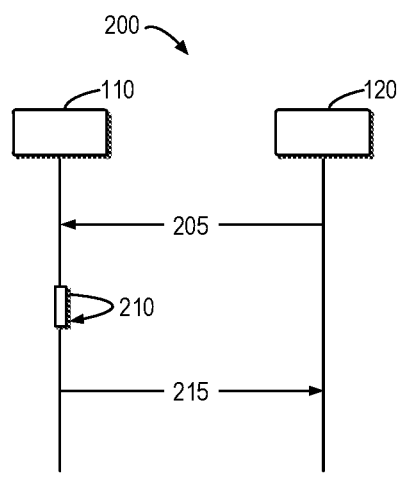
FIG. 2 illustrates a signaling flow between the first device and the second device according to some example embodiments of the present disclosure.

FIG. 2 shows a signaling flow 200 between the first device 110 and the second device 120 according to some example embodiments of the present disclosure. For the purpose of discussion, the signaling flow 200 will be described with reference to FIG. 1.

As shown in FIG. 2, the second device 120 transmits (205) to the first device 110 an indication associated with a change of a priority level for transmitting a PRS. The indication may be an explicit instruction to change the priority level. For example, the second device 120 may instruct the terminal device 110 to change the priority level when needed.

Alternatively or in addition, the second device 120 may send an indication for a priority configuration for the PRS transmission to implicitly indicate the change of the priority level. For example, in some example embodiments, the PRS priority may be configured to cyclically be changed with respect to other transmissions (such as PUSCH or PUCCH) on different transmission occasions of a PRS configuration. For example, the priority level of the PRS transmission may switch to a higher level once in each cycle. In this case, the second device 120 may send a configuration message to the first device 110 to indicate this PRS configuration associated with a set of priority levels for the PRS transmission. Accordingly, the first device 110 will know when to switch between the priority levels based on the configuration message that functions as an implicit indication for the change of the priority level.

The frequency or periodicity of the priority switching may depend on requirements of updating the positions which may vary for different applications utilizing positioning information and/or in accordance to positioning integrity requirements. For example, if an application needs more frequent updates of the positions and/or more positioning integrity is required, the switching frequency may be higher. Alternatively or in addition, the switching frequency may depend from a moving speed or mobility level of the first device 110. For example, when the first device 110 is moving faster, the priority level of the PRS transmission may switch more frequently to obtain the position information of the first device 110 in time.

A periodicity of priority switching configured for the related PRS configuration may be indicated by the second device 120 to the first device implement the cyclic switching of the PRS priority. For example, the configuration message to indicate the PRS configuration associated with different priority levels may further indicate the configured periodicity of the priority switching to implicit indicate the change of the priority level. Accordingly, the first device 110 may be aware of the timing of the PRS occasions with different priority levels and change the priority level on a certain PRS occasion.

Figure 3:
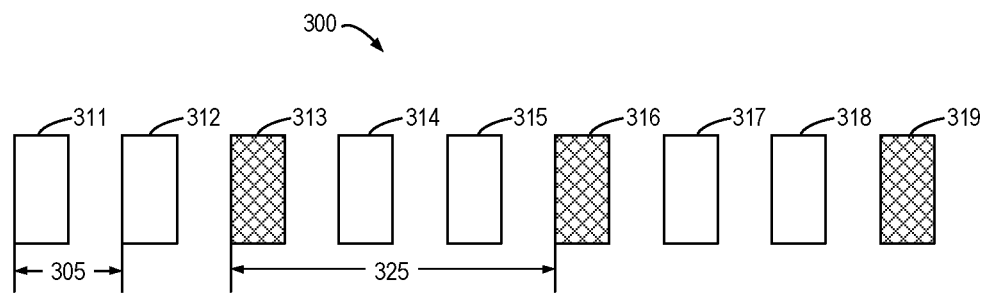
FIG. 3 illustrates an example priority configuration for the PRS transmission according to some example embodiments of the present disclosure.

FIG. 3 shows an example priority configuration 300 for the PRS transmission according to some example embodiments of the present disclosure.

In the priority configuration 300, a periodic PRS is configured to the first device 110 with a PRS periodicity 305. PRS occasions 311, . . . , 319 are configured with two different priority levels which will be referred to as a first priority level and a second priority level, respectively. In this example, a periodicity 325 of priority switching is configured such that every third PRS occasion 313, 316 or 319 is changed to the second priority level while other PRS occasions are configured with the first priority level.

In the case that the second priority level is higher than the first priority level, if the PRS transmission collides with other transmissions, a change to a higher priority level may enable the PRS transmission to be prioritized, thereby enhancing the positioning of the first device 110. As another example, the second priority level may be lower than the first priority level. In this case, a periodic change to a lower priority level may ensure the performance (such as QoS) of other transmissions.

In some example embodiments, after the priority switching periodicity 325 is configured, the periodicity 325 may be adjusted dynamically by the first device 110 and/or the second device 120. The dynamic adjustment may be based on assistance information provided by other devices such as a LMF, and/or the knowledge of the instantaneous mobility level of the first device 110.

In addition to the periodic switching of the PRS priority, the PRS priority may be changed in an aperiodic manner. For example, the priority switching may be triggered upon an event. As an example, the event may be related to the performance of the PRS transmission. For instance, if N≥1 consecutive PRS occasions are dropped due to de-prioritization over other transmissions, the very next PRS occasion in the same PRS configuration can have a higher priority level. In this case, the configuration message to indicate the PRS configuration with different priority levels may indicate a condition such as an event for switching between there different priority levels, for example, to instruct the first device 110 to monitor status (dropped or transmitted) of N consecutive PRS occasions prior to a PRS occasion. An example process of aperiodic priority switching will be discussed below with reference FIG. 4.

Figure 4:
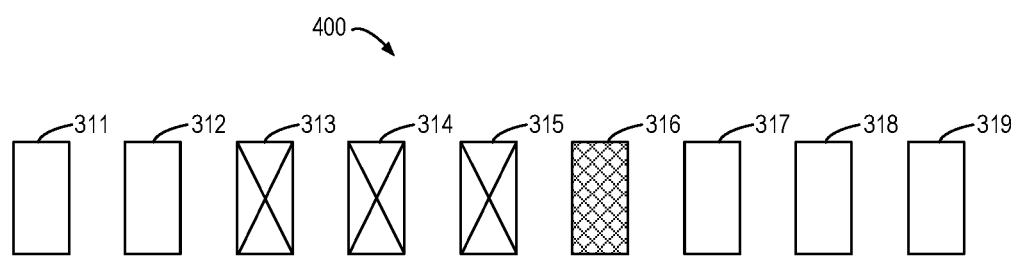
FIG. 4 illustrates an example process of aperiodic PRS priority adjustment based on consecutive dropping of the PRS according to some example embodiments of the present disclosure.

FIG. 4 shows an example process 400 of aperiodic PRS priority adjustment based on consecutive dropping of the PRS according to some example embodiments of the present disclosure.

Similar to the priority configuration 300 in FIG. 3, two priority levels including the first and second priority levels are configured to the same PRS configuration. In this example, the first priority level is lower than the second priority level. Different from the priority configuration 300 in FIG. 3, the PRS occasions 311, . . . , 319 are not periodically configured with a certain priority level. Instead, an event for switching between the priority levels is that the priority of a PRS can be boosted if N (for example, N=3) consecutive PRSs before are deprioritized and dropped. As shown, the PRSs on the PRS occasions 313, 314 and 315 with the first priority level are dropped, and therefore the PRS occasion 316 should be have the second priority level. Then, the later PRS occasions 317, 318 and 319 switch back to the first priority level.

In addition to an indication for a predefined event to trigger the aperiodic priority switching to implicitly indicate the change of the PRS priority level, in some example embodiments, the second device 120 may send an explicit instruction to change the priority level of the PRS transmission within the PRS configuration when needed. As such, the second device 120 can directly instruct the first device 110 to change the priority level of the PRS transmission.

In some example embodiments, more PRS configurations may be allocated to the first device 110 which have different priority levels for the PRS transmission. For example, one PRS configuration is associated with a priority level, and one or more other PRS configures are associated with another priority level. In these example embodiments, the second device 120 may send a configuration message to indicate these PRS configurations to implicitly indicate the change of the priority level of the PRS transmission. These configurations may be activated in a periodic and/or aperiodic manner. Accordingly, the configuration message for the plurality of PRS configurations may further indicate a periodicity or event for activating one of the PRS configurations.

Figure 5:
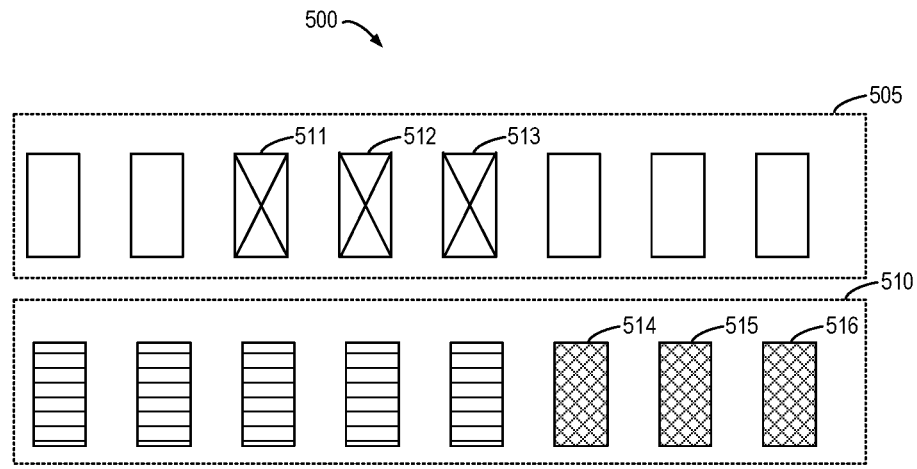
FIG. 5 illustrates an example process of aperiodic activation of one of a plurality of PRS configurations according to some example embodiments of the present disclosure.

FIG. 5 shows an example process 500 of aperiodic activation of one of a plurality of PRS configurations according to some example embodiments of the present disclosure.

As shown in FIG. 5, two PRS configurations are allocated to the first device 110, including, a first PRS configuration 505 and a second PRS configuration 510 which are associated with two different priority levels including the first and second priority levels. The first priority level is lower than the second priority level in this example. The PRS configuration with the lower first priority level is activated originally. When N consecutive lower-priority PRS occasions 511, 512 and 513 are de-prioritized due to conflict with other transmissions such as a PUSCH and/or PUCCH transmission, the PRS configuration with the higher second priority level is activated autonomously starting from a PRS occasion 514.

As an example, the higher-priority PRS configuration may be activated at least for a fixed period of time, including, for example, PRS occasions 514, 515 and 516. The higher-priority PRS configuration may be deactivated autonomously upon expiration of a timer, or occurrence of an event, or an instruction from the second device 120 to deactivate the higher-priority PRS.

Alternatively or in addition, the PRS configurations may be activated periodically. For example, in order to implement the periodic priority switching as shown in FIG. 3, in addition to allocating a PRS configuration with the different first and second priority levels to the first device 110 as discussed above, the second device 120 may allocate three PRS configurations with the first and second priority levels. The three PRS configurations are all activated with different timing of PRS occasions. Specifically, one (referred to a first PRS configuration) of the PRS configurations have the PRS occasions 311, 314 and 317, another one (referred to a second PRS configuration) of the PRS configurations have the PRS occasions 312, 315 and 318, and the other one (referred to a third PRS configuration) of the PRS configurations have the PRS occasions 313, 316 and 319. The first and second PRS configurations are assigned to the first priority level, and the third PRS configuration is assigned to the second priority level. Thus, one in three PRS occasions may have a different priority level than the other two occasions.

Still with reference to FIG. 2, based on the indication, the first device 110 changes (210) the priority level for the PRS transmission. For example, the first device 110 may change the priority level in according to the timing of the PRS occasions indicated by the second device 110. As another example, when the conditions for changing the priority level are met based on the indication, the first device 110 may change the priority level of a PRS configuration or change the PRS configuration to a further PRS configuration with a different priority level.

In some example embodiments, the conditions may be dynamically modified by the first device 110 and/or the second device 120. The modified condition may be sent in any suitable DL/UL signaling and, for example, indicated in a new configuration message.

If the priority level is changed to be higher, the PRS may be transmitted (not dropped) by the first device 110 when there is collision between the PRS transmission and other transmissions, thereby enhancing the positioning of the first device 110. Then, the second device 120 receives (215), based on the indication sent to the first device 110, the PRS from the first device 110.

Figure 6:
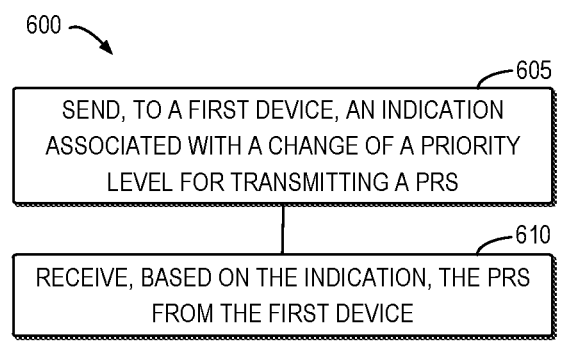
FIG. 6 illustrates a flowchart of an example method according to some example embodiments of the present disclosure.

FIG. 6 shows a flowchart of an example method 600 according to some example embodiments of the present disclosure. The method 600 can be implemented by the second device 120 as shown in FIG. 1. For the purpose of discussion, the method 600 will be described with reference to FIG. 1.

At block 605, the second device 120 sends, to the first device 110, an indication associated with a change of a priority level for transmitting a positioning reference signal. The indication may be implemented in any suitable form. For example, in the example embodiments where a set of PRS configurations is assigned to the first device 120 with a set of associated priority levels, the indication may comprise a configuration message to indicate the set of configurations. In some example embodiments, the configuration message may further indicate a rule or condition (such as a periodicity or event) for activation of one of the PRS configurations. For example, the configuration message may comprise a boosting parameter N which indicates that the PRS transmission is prioritized or the high-priority PRS configuration is activated, after N consecutive PRS occasions have been deprioritized over other transmissions.

As an example, the second device 120 indicates one periodic or semi-periodic PRS configuration to the first device 120 and may further indicate a PRS priority rule for each SRS occasions. For example, in the priority configuration 300 as shown in FIG. 3, every third SRS occasion (such as the PRS occasions 313, 316 or 319) applies the changed prioritization rule for the second priority level while other SRS occasions (such as the PRS occasions 311, 312, 314, 315, 317 and 318) apply the original prioritization rule for the first priority level.

In some example embodiments, the second device 120 may configure multiple periodic or semi-periodic PRS configurations to the first device 110 and indicates the PRS priority rule per configuration as the indication for the change of the priority level. Also taking the priority configuration 300 as shown in FIG. 3 as an example, as discussed above, the priority configuration 300 may be implemented by allocating three PRS configurations (including the first, second and third PRS configurations) with the first and second priority levels to the first device 110. In this case, every 1st PRS occasion (such as the PRS occasions 311, 314 or 317) associated with the first PRS configuration and every 2nd PRS occasion (such as the PRS occasions 312, 315 or 318) associated with the second PRS configuration apply an original prioritization rule of the first priority level, and every 3rd PRS occasion (such as the PRS occasions 313, 316 or 319) associated with the third PRS configuration applies a changed prioritization rule of the second priority level. In this example, the second device 120 may transmit a configuration message to the first device 110 to indicate the configured PRS configurations as well as the PRS priority rule per configuration as the indication with respect to the change of the priority level.

Alternatively or in addition, the second device 120 may utilize an aperiodic PRS when it knows that the current PRS will be deprioritized. For instance, the second device 120 configures a PRS configuration with normal prioritization rule. In some SRS occasions, the second device 120 may use an aperiodic SRS with a higher priority level to override the PRS configuration to ensure that the first device 110 would still transmit SRS for timely positioning. In this case, the second device 120 may send an instruction to the first device 110 to change the priority level.

The indication may be transmitted in any suitable way. For example, in the example embodiments where the second device 120 is implemented by a gNB and the first device 110 is implemented by a UE, the indication may be sent using RRC signaling. The embodiments related to the indication as discussed above with reference to FIG. 2 are likewise applicable to the method 600 and have similar effects. For the purpose of simplification, the details will be omitted.

Configurations related to the priority level of the PRS transmission may be determined by the second device 120 considering any suitable factors. In some example embodiments, before the priority configuration is determined, the second device 120 may determine requirements associated with a PRS priority. For example, the second device 120 may evaluate the required PRS transmission characteristic based on information from the third device such as a LMF and/or the first device 110.

In some example embodiments, the third device such as a LMF may recommend required PRS transmission characteristics to the second device 120 based on the positioning accuracy/integrity requirement of a client and/or application for the positioning of the first device 110. For example, the third device may send information about the priority requirements to the second device 120. Such information may be in the example embodiments where the second device 120 is implemented by a gNB and the third device is implemented by a LMF, such information may be transmitted via a NR Positioning Protocol A (NRPPa) message, for example, as part of the NRPPa message POSITIONING INFORMATION REQUEST.

In some other example embodiments, the requirements associated with the priority level may be determined by the second device 120 based on the positioning requirement (such as QoS) for the first device 110 and/or a mobility level of the first device 110. For example, if the positioning requirement for the first device 110 is higher, or if the mobility level of the first device 110 is higher, the priority level of the PRS transmission may be higher. Alternatively or in addition, the second device 120 may take its own traffic loading into account in determining the priority requirements.

The priority requirements to be determined by the second device 120 may comprise any requirement related to a priority level of the PRS transmission. Example of the requirements may comprise a priority level to be used for the PRS transmission, a minimum and/or maximum priority level to be used for the PRS transmission, and/or a periodicity for changing the priority level.

Based on the determined priority requirement, the second device 120 may determine the priority configuration for the PRS transmission. The priority configuration may comprise a set of possible priority levels for a PRS configuration, and/or a set of possible priority levels for a set of PRS configurations. The priority configuration may further comprise at least one condition for a change of the priority levels in a PRS configuration or activation of a high-priority SRS configuration (such as the priority switching periodicity, number of consecutive PRS de-prioritization and the like). Alternatively or in addition, the priority configuration may comprise dependency relationship of a PRS configuration to at least another PRS configuration which can be activated autonomously when the above conditions are met. In accordance with the determined priority configuration, the second device 120 may send to the first device 110 the indication associated with the change of the priority level of the PRS transmission.

Next, at block 610, the second device 120 receives the PRS from the first device 110 based on the indication that has been sent to the first device 110.

All operations and features as described above with reference to FIGS. 1-5 are likewise applicable to the method 600 and have similar effects. For the purpose of simplification, the details will be omitted.

Figure 7:
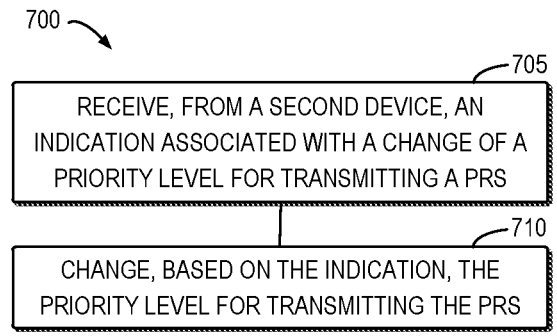
FIG. 7 illustrates a flowchart of an example method according to some other example embodiments of the present disclosure.

FIG. 7 shows a flowchart of an example method 700 according to some example embodiments of the present disclosure. The method 700 can be implemented by the first device 110 as shown in FIG. 1. For the purpose of discussion, the method 700 will be described with reference to FIG. 1.

At block 705, the first device 110 receives, from the second device 120, an indication associated with a change of a priority level for transmitting a PRS. As an example, the indication may comprise a configuration message that may indicate a set of configurations for the positioning reference signal associated with a set of priority levels for the transmission of the positioning reference signal and may further indicate a periodicity or an event for activating a configuration from the set of configurations for the positioning reference signal. As another example, the indication may comprise a configuration message that may indicate a configuration for the positioning reference signal associated with a set of priority levels for the transmission of the positioning reference signal and may further indicate a periodicity or an event for switching between priority levels from the set of priority levels. As a further example, the indication may comprise an instruction to change the priority level.

At block 710, based on the indication, the first device 110 changes the priority level for transmitting the PRS. For example, in the example embodiments where the indication is implemented by a configuration message to indicate a PRS configuration associated with a set of priority levels and a condition for priority switching, the first device 110 may determine the priority level of each PRS occasion of the related PRS configuration, based on a determination whether the indicated condition is met. When it is determined that the condition is met, the first device 110 may change the priority level.

The priority level may characterize the priority of a PRS transmission compared to other transmissions on certain channels (for example, PUSCH for different types of grants, and/or PUCCH carrying different types/priority of content). Some example priority levels compared with PUSCH are described as below:

High Priority PRS that can overwrite both dynamic grant PUSCH and configured grant PUSCH.

Medium Priority PRS that can overwrite configured grant PUSCH but not dynamic grant PUSCH.

Low Priority PRS that is always dropped when colliding with any PUSCH.

Some other example priority levels compared with PUCCH are described as below:

Top Priority PRS that can overwrite all PUCCHs.

High Priority PRS that can overwrite all PUCCHs except for PUCCH carrying high priority HARQ-ACK.

Medium Priority PRS that can only overwrite PUCCH carrying CSI but cannot overwrite any PUCCH carrying HARQ-ACK.

Low Priority PRS that is always dropped when colliding with any PUCCH.

It is to be understood that the priority levels with respect to PUSCH and PUCCH may be combined such that the both overlapping PUSCH and PUCCH can be taken into account when determining whether a PRS should be dropped or transmitted. It is also to be understood that the above priority levels are only illustrative, but not limited. Other definitions or setting of the priority levels are also possible.

If the PRS occasion overlaps with another transmission in the time domain, the first device 110 may determine whether the SRS should be dropped or transmitted based on the changed priority level. For example, if the changed priority level for the PRS transmission is higher than a priority level for the further transmission, the first device 110 may transmit the PRS. If the changed priority level is lower, the first device 110 may drop the PRS.

When the priority of SRS is adapted to be higher than other transmissions, there may be some special rules that the first device 110 may still decide to prioritize other transmissions instead of the PRS regardless of the adapted priority. For example, in the case that the colliding transmission is PUSCH transmission carrying data from a predetermined LCH such as a LCH with s priority level higher than a threshold, the first device 110 may drop the PRS even if the PRS has higher priority.

Alternatively or in addition, if the colliding transmission is the PUSCH transmission carrying a predetermined Media Access Control (MAC) Control Element (CE) such as MAC CEs with certain types or contents, the first device 110 may drop the PSR with a higher priority level. For example, if the MAC CE on the PUSCH carries a Buffer Status Report (BSR) relating to Ultra-Reliable and Low Latency Communications (URLLC), the first device 110 may drop the PSR.

As another example, if the colliding transmission is the PUSCH transmission carrying data with an approaching delivery deadline or that is running out of packet delay budget, the PRS may be dropped. The PUSCH transmission of a predetermined traffic flow may also override the PRS. For example, if the previous packet of this traffic flow has already been failed, the first device 110 may drop the PSR to ensure the QoS of the traffic flow. Alternatively or in addition, the PUSCH transmission multiplexed with predetermined UCI (for example, UCI of certain types/priority) or the PUCCH transmission carrying predetermined UCI may override the PSR with a higher priority level.

In some example embodiments, the second device 120 may further configure the first device 110 whether these special conditions should be checked before determining which of the colliding transmissions (for example, the PRS or PUSCH/PUCCH) should be prioritized.

All operations and features as described above with reference to FIGS. 1-6 are likewise applicable to the method 700 and have similar effects. For the purpose of simplification, the details will be omitted.

Figure 8:
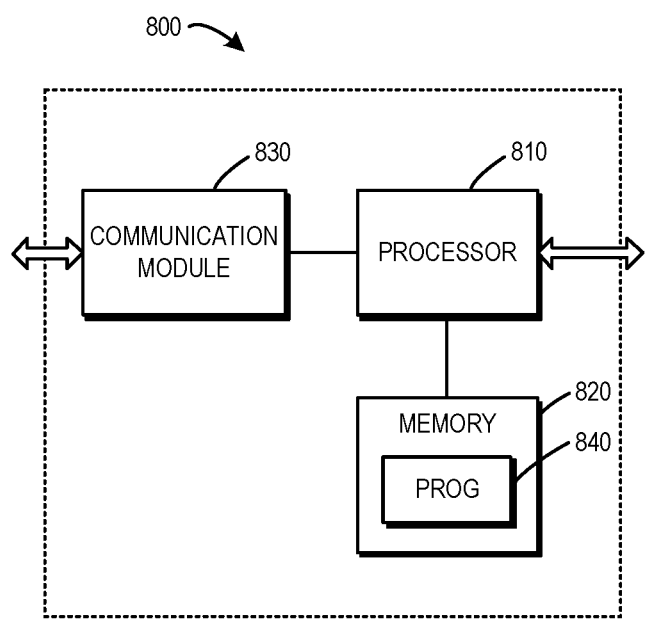
FIG. 8 illustrates a simplified block diagram of a device that is suitable for implementing example embodiments of the present disclosure.

FIG. 8 is a simplified block diagram of a device 800 that is suitable for implementing example embodiments of the present disclosure. The device 800 can be implemented at or as a part of the first device 110 or the second device 120 as shown in FIG. 1.

As shown, the device 800 includes a processor 810, a memory 820 coupled to the processor 810, a communication module 830 coupled to the processor 810, and a communication interface (not shown) coupled to the communication module 830. The memory 820 stores at least a program 840. The communication module 830 is for bidirectional communications, for example, via multiple antennas. The communication interface may represent any interface that is necessary for communication.

The program 840 is assumed to include program instructions that, when executed by the associated processor 810, enable the device 800 to operate in accordance with the example embodiments of the present disclosure, as discussed herein with reference to FIGS. 1-7. The example embodiments herein may be implemented by computer software executable by the processor 810 of the device 800, or by hardware, or by a combination of software and hardware. The processor 810 may be configured to implement various example embodiments of the present disclosure.

The memory 820 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 820 is shown in the device 800, there may be several physically distinct memory modules in the device 800. The processor 810 may be of any type suitable to the local technical network, and may include one or more of general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

When the device 800 acts as the second device 120 or a part of the second device 120, the processor 810 and the communication module 830 may cooperate to implement the method 600 as described above with reference to FIGS. 1-6. When the device 800 acts as the first device 110 or a part of the first device 110, the processor 810 and the communication module 830 may cooperate to implement the method 700 as described above with reference to FIG. 7. All operations and features as described above with reference to FIGS. 1-7 are likewise applicable to the device 800 and have similar effects. For the purpose of simplification, the details will be omitted.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of example embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 600 or 700 as described above with reference to FIGS. 1-7. Generally, program modules include routines, programs, libraries, objects, classes, components, data structures, or the like that perform particular tasks or implement particular abstract data types. The functionality of the program modules may be combined or split between program modules as desired in various example embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), Digital Versatile Disc (DVD), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular example embodiments. Certain features that are described in the context of separate example embodiments may also be implemented in combination in a single embodiment. Conversely, various features that are described in the context of a single embodiment may also be implemented in multiple example embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

Various example embodiments of the techniques have been described. In addition to or as an alternative to the above, the following examples are described. The features described in any of the following examples may be utilized with any of the other examples described herein.

In some aspects, a first device comprises: at least one processor; and at least one memory including computer program code; the at least one memory and the computer program code configured to, with the at least one processor, cause the first device to: receive, from a second device, an indication associated with a change of a priority level for transmitting a positioning reference signal; and change, based on the indication, the priority level for transmitting the positioning reference signal.

In some example embodiments, the indication associated with the change of the priority level comprises at least one of: a configuration message to indicate a set of configurations for the positioning reference signal associated with a set of priority levels for the transmission of the positioning reference signal; a configuration message to indicate a configuration for the positioning reference signal associated with a set of priority levels for the transmission of the positioning reference signal; or an instruction to change the priority level.

In some example embodiments, the configuration message to indicate the set of configurations for the positioning reference signal associated with the set of priority levels further indicates a periodicity or an event for activating a configuration from the set of configurations for the positioning reference signal; and/or the configuration message to indicate the configuration for the positioning reference signal associated with the set of priority levels further indicates a periodicity or an event for switching between priority levels from the set of priority levels.

In some example embodiments, the first device is further caused to: detect collision of the transmission of the positioning reference signal with a further transmission; and drop or transmit the positioning reference signal based on the changed priority level for the transmission of the positioning reference signal.

In some example embodiments, the first device is caused to drop or transmit the positioning reference signal by: transmitting the positioning reference signal if the changed priority level for the transmission of the positioning reference signal is higher than a priority level for the further transmission.

In some example embodiments, the first device is caused to drop or transmit the positioning reference signal by: dropping the positioning reference signal if the changed priority level for the transmission of the positioning reference signal is lower than a priority level for the further transmission.

In some example embodiments, the first device is further caused to: drop the positioning reference signal if the further transmission comprises at least one of: transmission of data from a predetermined LCH on a physical uplink shared channel, transmission of a predetermined media access control control element on a physical uplink shared channel, transmission of data with an approaching delivery deadline on a physical uplink shared channel, transmission of a predetermined traffic flow on a physical uplink shared channel, transmission of a physical uplink shared channel multiplexed with transmission of predetermined uplink control information, or transmission of predetermined uplink control information on a physical uplink control channel.

In some aspects, a second device comprises: at least one processor; and at least one memory including computer program code; the at least one memory and the computer program code configured to, with the at least one processor, cause the second device to: send, to a first device, an indication associated with a change of a priority level for transmitting, by the first device, a positioning reference signal; and receive, based on the indication, the positioning reference signal from the first device.

In some example embodiments, the indication associated with the change of the priority level comprises at least one of: a configuration message to indicate a set of configurations for the positioning reference signal associated with a set of priority levels for the transmission of the positioning reference signal; a configuration message to indicate a configuration for the positioning reference signal associated with a set of priority levels for the transmission of the positioning reference signal; or an instruction to change the priority level.

In some example embodiments, the configuration message to indicate the set of configurations for the positioning reference signal associated with the set of priority levels further indicates a periodicity or an event for activating a configuration from the set of configurations for the positioning reference signal; and/or the configuration message to indicate the configuration for the positioning reference signal associated with the set of priority levels further indicates a periodicity or an event for switching between priority levels from the set of priority levels.

In some example embodiments, the second device is caused to send the indication by: sending the indication to the first device based on requirement associated with the priority level for transmitting the positioning reference signal.

In some example embodiments, the second device is further caused to: determining the requirement associated with the priority level based on at least one of: information about the requirement associated with the priority level, from a third device, positioning requirement associated with the first device, or a mobility level of the first device.

In some example embodiments, the requirement associated with the priority level comprises at least one of: a priority level to be used for the transmission of the positioning reference signal; a minimum priority level to be used for the transmission of the positioning reference signal; a maximum priority level to be used for the transmission of the positioning reference signal; or a periodicity for changing the priority level.

In some aspects, a method implemented at a first device comprises: receiving, from a second device, an indication associated with a change of a priority level for transmitting a positioning reference signal; and changing, based on the indication, the priority level for transmitting the positioning reference signal.

In some example embodiments, the indication associated with the change of the priority level comprises at least one of: a configuration message to indicate a set of configurations for the positioning reference signal associated with a set of priority levels for the transmission of the positioning reference signal; a configuration message to indicate a configuration for the positioning reference signal associated with a set of priority levels for the transmission of the positioning reference signal; or an instruction to change the priority level.

In some example embodiments, the configuration message to indicate the set of configurations for the positioning reference signal associated with the set of priority levels further indicates a periodicity or an event for activating a configuration from the set of configurations for the positioning reference signal; and/or the configuration message to indicate the configuration for the positioning reference signal associated with the set of priority levels further indicates a periodicity or an event for switching between priority levels from the set of priority levels.

In some example embodiments, the method further comprises: detecting collision of the transmission of the positioning reference signal with a further transmission; and dropping or transmitting the positioning reference signal based on the changed priority level for the transmission of the positioning reference signal.

In some example embodiments, dropping or transmitting the positioning reference signal comprises: transmitting the positioning reference signal if the changed priority level for the transmission of the positioning reference signal is higher than a priority level for the further transmission.

In some example embodiments, dropping or transmitting the positioning reference signal comprises: dropping the positioning reference signal if the changed priority level for the transmission of the positioning reference signal is lower than a priority level for the further transmission.

In some example embodiments, the method further comprises: dropping the positioning reference signal if the further transmission comprises at least one of: transmission of data from a predetermined LCH on a physical uplink shared channel, transmission of a predetermined media access control control element on a physical uplink shared channel, transmission of data with an approaching delivery deadline on a physical uplink shared channel, transmission of a predetermined traffic flow on a physical uplink shared channel, transmission of a physical uplink shared channel multiplexed with transmission of predetermined uplink control information, or transmission of predetermined uplink control information on a physical uplink control channel.

In some aspects, a method implemented at a second device comprises: sending, to a first device, an indication associated with a change of a priority level for transmitting, by the first device, a positioning reference signal; and receiving, based on the indication, the positioning reference signal from the first device.

In some example embodiments, the indication associated with the change of the priority level comprises at least one of: a configuration message to indicate a set of configurations for the positioning reference signal associated with a set of priority levels for the transmission of the positioning reference signal; a configuration message to indicate a configuration for the positioning reference signal associated with a set of priority levels for the transmission of the positioning reference signal; or an instruction to change the priority level.

In some example embodiments, the configuration message to indicate the set of configurations for the positioning reference signal associated with the set of priority levels further indicates a periodicity or an event for activating a configuration from the set of configurations for the positioning reference signal; and/or the configuration message to indicate the configuration for the positioning reference signal associated with the set of priority levels further indicates a periodicity or an event for switching between priority levels from the set of priority levels.

In some example embodiments, sending the indication comprises: sending the indication to the first device based on requirement associated with the priority level for transmitting the positioning reference signal.

In some example embodiments, the method further comprises: determining the requirement associated with the priority level based on at least one of: information about the requirement associated with the priority level, from a third device, positioning requirement associated with the first device, or a mobility level of the first device.

In some example embodiments, the requirement associated with the priority level comprises at least one of: a priority level to be used for the transmission of the positioning reference signal; a minimum priority level to be used for the transmission of the positioning reference signal; a maximum priority level to be used for the transmission of the positioning reference signal; or a periodicity for changing the priority level.

In some aspects, an apparatus comprises: means for receiving, from a second device, an indication associated with a change of a priority level for transmitting a positioning reference signal; and means for changing, based on the indication, the priority level for transmitting the positioning reference signal.

In some example embodiments, the indication associated with the change of the priority level comprises at least one of: a configuration message to indicate a set of configurations for the positioning reference signal associated with a set of priority levels for the transmission of the positioning reference signal; a configuration message to indicate a configuration for the positioning reference signal associated with a set of priority levels for the transmission of the positioning reference signal; or an instruction to change the priority level.

In some example embodiments, the configuration message to indicate the set of configurations for the positioning reference signal associated with the set of priority levels further indicates a periodicity or an event for activating a configuration from the set of configurations for the positioning reference signal; and/or the configuration message to indicate the configuration for the positioning reference signal associated with the set of priority levels further indicates a periodicity or an event for switching between priority levels from the set of priority levels.

In some example embodiments, the apparatus further comprises: means for detecting collision of the transmission of the positioning reference signal with a further transmission; and means for dropping or transmitting the positioning reference signal based on the changed priority level for the transmission of the positioning reference signal.

In some example embodiments, the means for dropping or transmitting the positioning reference signal comprises: means for transmitting the positioning reference signal if the changed priority level for the transmission of the positioning reference signal is higher than a priority level for the further transmission.

In some example embodiments, the means for dropping or transmitting the positioning reference signal comprises: means for dropping the positioning reference signal if the changed priority level for the transmission of the positioning reference signal is lower than a priority level for the further transmission.

In some example embodiments, the apparatus further comprises: means for dropping the positioning reference signal if the further transmission comprises at least one of: transmission of data from a predetermined LCH on a physical uplink shared channel, transmission of a predetermined media access control control element on a physical uplink shared channel, transmission of data with an approaching delivery deadline on a physical uplink shared channel, transmission of a predetermined traffic flow on a physical uplink shared channel, transmission of a physical uplink shared channel multiplexed with transmission of predetermined uplink control information, or transmission of predetermined uplink control information on a physical uplink control channel.

In some aspects, an apparatus comprises: means for sending, to a first device, an indication associated with a change of a priority level for transmitting, by the first device, a positioning reference signal; and means for receiving, based on the indication, the positioning reference signal from the first device.

In some example embodiments, the indication associated with the change of the priority level comprises at least one of: a configuration message to indicate a set of configurations for the positioning reference signal associated with a set of priority levels for the transmission of the positioning reference signal; a configuration message to indicate a configuration for the positioning reference signal associated with a set of priority levels for the transmission of the positioning reference signal; or an instruction to change the priority level.

In some example embodiments, the configuration message to indicate the set of configurations for the positioning reference signal associated with the set of priority levels further indicates a periodicity or an event for activating a configuration from the set of configurations for the positioning reference signal; and/or the configuration message to indicate the configuration for the positioning reference signal associated with the set of priority levels further indicates a periodicity or an event for switching between priority levels from the set of priority levels.

In some example embodiments, the means for sending the indication comprises: means for sending the indication to the first device based on requirement associated with the priority level for transmitting the positioning reference signal.

In some example embodiments, the apparatus further comprises: means for determining the requirement associated with the priority level based on at least one of: information about the requirement associated with the priority level, from a third device, positioning requirement associated with the first device, or a mobility level of the first device.

In some example embodiments, the requirement associated with the priority level comprises at least one of: a priority level to be used for the transmission of the positioning reference signal; a minimum priority level to be used for the transmission of the positioning reference signal; a maximum priority level to be used for the transmission of the positioning reference signal; or a periodicity for changing the priority level.

In some aspects, a computer readable storage medium comprises program instructions stored thereon, the instructions, when executed by a processor of a device, causing the device to perform the method according to some example embodiments of the present disclosure.

What is claimed is:

1. An apparatus comprising:
   at least one processor; and
   at least one memory storing instructions that, when executed by the at least one processor, cause the apparatus at least to:
   receive an indication associated with a change of a priority level for transmitting a positioning reference signal; and
   change, based on the indication, the priority level for transmitting the positioning reference signal
   wherein the indication associated with the change of the priority level comprises the following:
   a configuration message to indicate a set of configurations for the positioning reference signal associated with a set of priority levels for the transmission of the positioning reference signal;
   a configuration message to indicate a configuration for the positioning reference signal associated with a set of priority levels for the transmission of the positioning reference signal; and
   an instruction to change the priority level
   wherein the apparatus is caused to:
   detect collision of the transmission of the positioning reference signal with a further transmission; and
   drop the positioning reference signal based on the changed priority level for the transmission of the positioning reference signal,
   wherein the apparatus is further caused to:
   drop the positioning reference signal when the further transmission comprises the following:
   transmission of data from a predetermined logical channel on a physical uplink shared channel,
   transmission of a predetermined media access control element on a physical uplink shared channel,
   transmission of data with an approaching delivery deadline on a physical uplink shared channel,
   transmission of a predetermined traffic flow on a physical uplink shared channel, transmission of a physical uplink shared channel multiplexed with transmission of predetermined uplink control information, and transmission of predetermined uplink control information on a physical uplink control channel.

2. The apparatus of claim 1, wherein the configuration message to indicate the set of configurations for the positioning reference signal associated with the set of priority levels further indicates a periodicity or an event for activating a configuration from the set of configurations for the positioning reference signal; or the configuration message to indicate the configuration for the positioning reference signal associated with the set of priority levels further indicates a periodicity or an event for switching between priority levels from the set of priority levels.

3. The apparatus of claim 1, wherein the priority level characterizes the priority of a positioning reference signal transmission compared to other transmissions on channels and comprises:

a high priority positioning reference signal that can overwrite both dynamic grant physical uplink shared channel and configured grant physical uplink shared channel, a medium priority positioning reference signal that can overwrite configured grant physical uplink shared channel but not dynamic grant physical uplink shared channel, a low priority positioning reference signal that is always dropped when colliding with any physical uplink shared channel.

4. The apparatus of claim 3, wherein the apparatus is caused to drop or transmit the positioning reference signal by:

transmitting the positioning reference signal when the changed priority level for the transmission of the positioning reference signal is higher than a priority level for the further transmission.

5. The apparatus of claim 3, wherein the apparatus is caused to drop or transmit the positioning reference signal by:

dropping the positioning reference signal when the changed priority level for the transmission of the positioning reference signal is lower than a priority level for the further transmission.

6. The apparatus of claim 3, wherein the priority level characterizes the priority of a positioning reference signal transmission compared to other transmissions on channels and comprises:

a top priority positioning reference signal that can overwrite all physical uplink control channels, a high priority positioning reference signal that can overwrite all physical uplink shared channels except for physical uplink control channel carrying high priority HARQ-ACK, a medium priority positioning reference signal that can only overwrite physical uplink shared channel carrying channel state information but cannot overwrite any physical uplink shared channel carrying HARQ-ACK, a low priority positioning reference signal that is always dropped when colliding with any physical uplink control channel.

7. An apparatus comprising:

at least one processor; and at least one memory storing instructions that, when executed by the at least one processor, cause the apparatus at least to:

send, to a first device, an indication associated with a change of a priority level for transmitting, by the first device, a positioning reference signal; and receive, based on the indication, the positioning reference signal from the first device, wherein the indication associated with the change of the priority level comprises the following:

a configuration message to indicate a set of configurations for the positioning reference signal associated with a set of priority levels for the transmission of the positioning reference signal;

a configuration message to indicate a configuration for the positioning reference signal associated with a set of priority levels for the transmission of the positioning reference signal; and an instruction to change the priority level, wherein the apparatus is caused to:

determine the requirement associated with the priority level based on:

information about the requirement associated with the priority level, from a third device, positioning requirement associated with the first device, and a mobility level of the first device, wherein the requirement associated with the priority level comprises the following:

a priority level to be used for the transmission of the positioning reference signal;

a minimum priority level to be used for the transmission of the positioning reference signal;

a maximum priority level to be used for the transmission of the positioning reference signal; and a periodicity for changing the priority level.

8. The apparatus of claim 7, wherein:

the configuration message to indicate the set of configurations for the positioning reference signal associated with the set of priority levels further indicates a periodicity or an event for activating a configuration from the set of configurations for the positioning reference signal; or the configuration message to indicate the configuration for the positioning reference signal associated with the set of priority levels further indicates a periodicity or an event for switching between priority levels from the set of priority levels.

9. The apparatus of claim 7, wherein the apparatus is caused to send the indication by:

sending the indication to the first device based on requirement associated with the priority level for transmitting the positioning reference signal.

10. A method implemented at a first device, comprising:

receiving, from a second device, an indication associated with a change of a priority level for transmitting a positioning reference signal; and changing, based on the indication, the priority level for transmitting the positioning reference signal, wherein the indication associated with the change of the priority level comprises at least one of:

a configuration message to indicate a set of configurations for the positioning reference signal associated with a set of priority levels for the transmission of the positioning reference signal;

a configuration message to indicate a configuration for the positioning reference signal associated with a set of priority levels for the transmission of the positioning reference signal; or an instruction to change the priority level, the method further comprising:
dropping the positioning reference signal when the further transmission comprises the following:
- transmission of data from a predetermined logical channel on a physical uplink shared channel,
- transmission of a predetermined media access control element on a physical uplink shared channel,
- transmission of data with an approaching delivery deadline on a physical uplink shared channel,
- transmission of a predetermined traffic flow on a physical uplink shared channel,
- transmission of a physical uplink shared channel multiplexed with transmission of predetermined uplink control information, and
- transmission of predetermined uplink control information on a physical uplink control channel.

11. The method of claim 10, wherein
the configuration message to indicate the set of configurations for the positioning reference signal associated with the set of priority levels further indicates a periodicity or an event for activating a configuration from the set of configurations for the positioning reference signal; or
the configuration message to indicate the configuration for the positioning reference signal associated with the set of priority levels further indicates a periodicity or an event for switching between priority levels from the set of priority levels.

12. The method of claim 10, further comprising:
detecting collision of the transmission of the positioning reference signal with a further transmission; and
dropping or transmitting the positioning reference signal based on the changed priority level for the transmission of the positioning reference signal.

13. The method of claim 12, wherein dropping or transmitting the positioning reference signal comprises:
transmitting the positioning reference signal when the changed priority level for the transmission of the positioning reference signal is higher than a priority level for the further transmission.

14. The method of claim 12, wherein dropping or transmitting the positioning reference signal comprises:
dropping the positioning reference signal when the changed priority level for the transmission of the positioning reference signal is lower than a priority level for the further transmission.

* * * * *